(12) United States Patent
Wilson et al.

(10) Patent No.: US 11,689,758 B2
(45) Date of Patent: Jun. 27, 2023

(54) MANAGING ADDRESSABLE ASSET CAMPAIGNS ACROSS MULTIPLE DEVICES

(71) Applicant: Invidi Technologies Corporation, Princeton, NJ (US)

(72) Inventors: Daniel C. Wilson, Edmonton (CA); Bruce J. Anderson, Chesterfield, NJ (US); Alden Lloyd Peterson, II, New Providence, NJ (US); Howard Fiderer, Princeton Junction, NJ (US)

(73) Assignee: INVIDI TECHNOLOGIES CORPORATION, Princeton, NJ (US)

( * ) Notice: Subject to any disclaimer, the term of this patent is extended or adjusted under 35 U.S.C. 154(b) by 0 days.

(21) Appl. No.: 16/932,042

(22) Filed: Jul. 17, 2020

(65) Prior Publication Data
US 2021/0352349 A1 Nov. 11, 2021

Related U.S. Application Data

(63) Continuation of application No. 15/403,827, filed on Jan. 11, 2017, now Pat. No. 10,735,795.

(51) Int. Cl.
*H04N 21/2668* (2011.01)
*H04N 21/442* (2011.01)
(Continued)

(52) U.S. Cl.
CPC ..... *H04N 21/2668* (2013.01); *G06Q 30/0242* (2013.01); *G06Q 30/0244* (2013.01);
(Continued)

(58) Field of Classification Search
CPC ........ H04N 21/23424; H04N 21/2668; H04N 21/25866; H04N 21/26258;
(Continued)

(56) References Cited

U.S. PATENT DOCUMENTS 6,286,005 B1 * 9/2001 Cannon .............. G06Q 30/0201
455/2.01
6,698,020 B1 * 2/2004 Zigmond ........... H04N 21/4622
725/139
(Continued)

OTHER PUBLICATIONS

U.S. Appl. No. 13/673,869, filed Nov. 9, 2012, by Anderson et al.
(Continued)

*Primary Examiner* — Robert J Hance
(74) *Attorney, Agent, or Firm* — Davis Graham & Stubbs LLP (57) ABSTRACT

An addressable asset system (100) includes user equipment devices (UEDs) (102), a cloud decisioning system (CDS) (106) and a business data management system (BDMS) (108). The BDMS (108) collects information that is used by the CDS (106) to manage delivery of assets by the UEDs (102). In an exemplary network architecture, the CDS (106) is independent of the network insertion and delivery equipment. In particular, the broadcast content stream is delivered to the UED (102) by a digital content management(DCM) system (110) and certain assets are separately delivered to the UED (102) by the asset download network (AND) (112). This allows the CDS (106) to remain independent of the network of the UED (102) such that the CDS (106) can operate across networks.

43 Claims, 5 Drawing Sheets

(51) Int. Cl.
*H04N 21/45* (2011.01)
*H04N 21/81* (2011.01)
*G06Q 30/0241* (2023.01)
*G06Q 30/0242* (2023.01)
*H04N 21/433* (2011.01)
*H04N 21/262* (2011.01)
*H04N 21/258* (2011.01)
*H04N 21/6543* (2011.01)
*H04N 21/658* (2011.01)
*H04N 21/234* (2011.01)
*H04N 21/458* (2011.01)

(52) U.S. Cl.
CPC ... *G06Q 30/0276* (2013.01); *H04N 21/23424* (2013.01); *H04N 21/25866* (2013.01); *H04N 21/26258* (2013.01); *H04N 21/4331* (2013.01); *H04N 21/44204* (2013.01); *H04N 21/44218* (2013.01); *H04N 21/44222* (2013.01); *H04N 21/44224* (2020.08); *H04N 21/458* (2013.01); *H04N 21/4532* (2013.01); *H04N 21/6543* (2013.01); *H04N 21/6582* (2013.01); *H04N 21/812* (2013.01)

(58) Field of Classification Search
CPC ......... H04N 21/4331; H04N 21/44204; H04N 21/44218; H04N 21/44222; H04N 21/44224; H04N 21/4532; H04N 21/458; H04N 21/6543; H04N 21/6582; H04N 21/812; G06Q 30/0242; G06Q 30/0244; G06Q 30/0276
See application file for complete search history.

(56) References Cited

U.S. PATENT DOCUMENTS

| | | | |
|---|---|---|---|
| 7,849,477 B2 | 12/2010 | Cristofalo et al. | |
| 8,108,895 B2 | 1/2012 | Anderson et al. | |
| 8,146,126 B2 | 3/2012 | Downey et al. | |
| 8,484,676 B1* | 7/2013 | Narsimhan | H04N 21/4126 725/23 |
| 8,850,473 B2 | 9/2014 | Sheehan et al. | |
| 9,693,086 B2 | 6/2017 | Kouritzin et al. | |
| 9,706,253 B1* | 7/2017 | Funk | H04N 21/25891 |
| 9,729,916 B2 | 8/2017 | Sheehan et al. | |
| 10,735,795 B2 | 8/2020 | Wilson et al. | |
| 2002/0049968 A1 | 4/2002 | Wilson et al. | |
| 2002/0083439 A1* | 6/2002 | Eldering | H04N 7/165 348/E7.063 |
| 2002/0083441 A1* | 6/2002 | Flickinger | H04H 60/27 725/35 |
| 2008/0216107 A1 | 9/2008 | Downey et al. | |
| 2011/0184807 A1 | 7/2011 | Wang et al. | |
| 2011/0320287 A1* | 12/2011 | Holt | H04N 21/812 709/231 |
| 2012/0072282 A1 | 3/2012 | Leigh et al. | |
| 2012/0260286 A1 | 10/2012 | Rothschild et al. | |
| 2013/0254787 A1* | 9/2013 | Cox | H04N 21/252 725/13 |
| 2013/0268963 A1* | 10/2013 | Nugent | H04N 21/812 725/32 |
| 2014/0157305 A1 | 6/2014 | Del Sordo et al. | |
| 2014/0188603 A1* | 7/2014 | Des Jardins | G06Q 30/0277 705/14.49 |
| 2014/0282723 A1* | 9/2014 | Sinha | H04H 60/37 725/35 |
| 2015/0026719 A1 | 1/2015 | Menon | |
| 2016/0316233 A1* | 10/2016 | Ghadi | H04N 21/4302 |
| 2017/0085962 A1* | 3/2017 | Maughan | H04N 21/25883 |
| 2017/0098246 A1* | 4/2017 | Vasudevan | G06Q 30/0267 |

OTHER PUBLICATIONS

International Search Report and Written Opinion issued in International Application No. PCT/US2018/013369 dated Apr. 27, 2018, 24 pp.

Prosecution History of U.S. Appl. No. 15/403,827, dated Jan. 3, 2018-Apr. 3, 2020, 138 pp.

\* cited by examiner

MANAGING ADDRESSABLE ASSET CAMPAIGNS ACROSS MULTIPLE DEVICES

CROSS REFERENCE TO RELATED APPLICATIONS

This application is a continuation of U.S. patent application Ser. No. 15/403,827, entitled "MANAGING ADDRESSABLE ASSET CAMPAIGNS ACROSS MULTIPLE DEVICES," and filed on Jan. 11, 2017, the entire contents of which are hereby incorporated within by reference.

FIELD OF THE INVENTION

The present invention relates generally to delivering addressable or targeted assets to users of user equipment devices such as televisions or streaming devices and, in particular, to managing and monitoring addressable asset campaigns, including across multiple devices, multiple networks and/or multiple modalities.

BACKGROUND OF THE INVENTION

Asset providers, e.g., providers of advertisements, public service announcements and other content, put considerable effort into the design of campaigns. Such campaigns are defined in relation to, among other things, where and how the asset will be delivered (e.g., what media modalities, in connection with what programming/other assets, etc.), when the asset will be delivered (e.g., during what time frame, at what time-of-day, how frequently, how many total times) and to whom (e.g., defined in relation to demographic segments, income, purchasing behavior, lifestyles, interests, etc.). Over many years, these campaigns have been analyzed to optimize campaign effectiveness and many professionals have devoted their careers to understanding the art and science of campaign design.

For example, the process of developing a television advertising campaign may begin by conducting extensive surveys and market studies to define a target audience for a product or service to be advertised. An advertising agency may be retained to develop an advertisement or set of advertisements intended to produce the desired response from the targeted audience. The advertisements may be tested on focus groups or test markets and results analyzed. Additional studies and expertise may be applied to determine how many times the advertisement needs to be presented to the target audience for the message to be effectively conveyed, how many times would result in diminishing returns or be counterproductive, how should a set of related advertisements be sequenced, what channels/programming yield useful associations or should be avoided, etc.

Even after goals concerning delivery of impressions have been defined, considerable effort is needed to determine how to execute the campaign. Conventionally, in the case of television advertising, this has involved contracting to purchase "spots" in particular programming (an advertising break in a program may have multiple spots for ad placement) or otherwise contract for delivery of some defined level of dissemination. In this regard, the purchaser may consider ratings information, other viewing statistics and research results, as well as costs (e.g., cost per thousand viewers or CPM), campaign budget and subjective considerations that inform the art of campaign design. The campaign may be modified during execution based on feedback, changed goals or the like.

This considerable knowledge base is being impacted by developments in the field that present evolving challenges and opportunities. Among the more significant developments in this regard are the emergence of addressable advertising and the evolution of media devices and consumption patterns.

Addressable advertising relates to the ability to customize, at least to some extent, the content stream delivered to individual network users, even in connection with broadcast programming. For example, it is becoming increasingly common for different viewers watching the same broadcast programming on the same channel in real-time to receive different advertisements. The advertisements may be selected based on determined or estimated characteristics of the viewer, such as demographic attributes or purchasing behavior and, in some cases, may be highly specific or even unique to that viewer. While this enables targeting with fine granularity, it also entails a paradigm shift from buying spots to buying impressions and erodes the experiential knowledge that informs the art of campaign design.

This art is further impacted by the evolution of media devices and habits of viewers. Increasingly, programming is being consumed using DVRs, streaming devices (computers, tablets, televisions that can access data networks, phones, etc.) and other media devices and are not limited to viewing real-time, linear broadcast programming. In some cases, network providers are marketing plans such as TV Anywhere plans that enable and encourage consumption of broadcast television content at the convenience of customers. While this enhances the experience for the consumer, and expands potential advertising opportunities, it also significantly complicates campaign design and execution. Among other things, some of those modalities enable skipping of assets (e.g., fast-forwarding through or tuning/clicking away from assets) and the modalities generally complicate estimating and tracking viewership.

SUMMARY OF THE INVENTION

The present invention is directed to a system and associated functionality for managing and monitoring the delivery of assets to network users to comply with campaign specifications. A system is disclosed for managing and monitoring asset delivery that is largely independent of content/asset delivery mechanisms. The system thus facilitates management and monitoring of asset delivery with respect to a single device or multiple devices, including, multiple devices of multiple networks or modalities, e.g., a television, a laptop and a tablet. The system therefore assists in designing and executing campaigns by providing some assurance that users can be reached with a desired frequency using known modalities and that the desired total number of impressions can be reasonably controlled. Asset providers can also submit asset delivery requests for executing a campaign via a single platform/process with a better understanding of costs and cost rates. In this manner, existing knowledge and skills can be readily translated to this evolving marketplace even as new techniques are developed to capitalize on new opportunities.

In accordance with one aspect of the invention, a system and associated functionality is provided the enables coordinated control of asset delivery across a managed set of user equipment devices (UEDs). The UEDs communicate with an asset targeting system that has information concerning a set of assets that are available for scheduling for delivery to particular users. For example, the system may be implemented in connection with one or more servers that communicate with the UEDs and other platforms at least in part via a pathway of a data network. The system receives an indication of an identified asset delivery opportunity (ADO) (e.g., a product placement opportunity or advertising break in real-time or linear programming or in streaming or non-linear programming) and transmits a playlist of one or more assets for the ADO. For example, the playlist may include a single asset to be played, multiple assets to be played in series, or multiple asset options from which the device can select an asset or assets to play. In the latter regard, it will be appreciated that the device may optionally include logic for making selections based on user demographics, location, monitored asset delivery (e.g., associated with the set of UEDs), etc. However, the inventive system can advantageously be implemented without requiring any specialized equipment or logic on the user side.

The playlist can be based on user impression information and campaign specification information for the first asset. For example, the user impression information may include information concerning the times and completeness of previous deliveries of the asset to the user that can be used to monitor and manage frequency and pace of asset delivery and total number of impressions (e.g., one complete delivery of an asset, or some defined consumption level less or more than a complete delivery, or delivery combined with some other attribute indicative of presence and/or engagement, may be defined as an impression). Such impressions may be aggregated over different devices, networks and modalities and/or tracked separately for different devices/networks/modalities. The campaign specification information relates to a desired level of dissemination for the asset and may be based on an asset delivery request entered on a contracting platform. For example, the asset delivery request may include targeting constraints for the target audience and a desired audience size or campaign cost as well as specifications concerning the frequency, total number of impressions, sequencing of assets, and the like for individual users.

For example, the playlist for a particular user or UED may be based in part on a comparison of the user impression information to the campaign specification information and potentially other considerations. Thus, if a contracting party (e.g., an asset provider) specifies each targeted user should receive a specified asset at least 10 but not more than 20 times during a specified time period or date range, and specifies that at least 8 of those impressions should be in connection with linear programming, and if the ADO is associated with linear programming and the relevant user at that time needs additional linear impressions before an impending expiration of a campaign, the asset may be prioritized for inclusion in the playlist. The system may also take into account the value of delivery, the need to fulfill other campaigns and other considerations in generating the playlist.

The system can update the user impression information for the first asset based on the UED playing the first asset. For example, the system may receive reports from servers or headend equipment involved in transmitting the asset and/or from UEDs that control playing of the asset. In either case, the reports may include an indication that the asset was played, the time that the asset was played, information about whether the asset played in its entirety or that play was incomplete, and information indicating presence, interest, active engagement or the like. In some contexts, such as certain broadcast network contexts, such reports may most practically originate at least in part from the UED. The system may also obtain report information from retail outlets, credit agencies, advertisers or others concerning purchases, site visits or other indications of engagement or effectiveness related to the asset. The reports can be obtained and the user impression information can be updated in substantially real-time (e.g., reports provided via the internet) or periodically, thus enabling accurate and timely control of campaign fulfillment parameters such as frequency and total number of impressions.

The assets may be delivered to the UED at playtime or ahead of playtime for storage at the UED. For example, the system may instruct the UED to store the asset at a storage structure associated with the UED or may instruct the UED to play an asset transmitted in real-time during the ADO. Additionally or alternatively, the UED may indicate to the system what assets are available for playing so that the system can use that information to construct the playlist. The assets may be transmitted to the UED by a platform associated with the system or separate therefrom, and may be controlled at least in part by the system or independent thereof.

In accordance with another aspect of the present invention, a system and associated functionality are provided for monitoring consumption of assets on one UED to select assets for delivery on another UED. More specifically, the functionality involves receiving an indication, for a first UED of a set of UEDs of a user, that the first UED has played a first asset of a set of assets. For example, as discussed above, a UED or other platform may provide a report concerning asset delivery. Based on the received indication, user impression information for the first asset is updated and the updated impression information can be compared to campaign specification information. For example, the campaign specification information may specify a target of one or more impressions delivered to the user via the first UED. When the campaign specification information is satisfied, a playlist may be transmitted, for a second UED of the set of UEDs, directing the play of a second asset, the same as or different than the first asset, at a second, different UED of the set of UEDs. In this manner, for example, a television or set top box of a user may be directed to play a television commercial after the user has received an image or stream advertisement via the internet or vice versa.

In accordance with a further aspect of the present invention, a system and associated methodology are provided that enable addressable asset delivery independent of the architecture of the UED network. It will be appreciated that addressable asset delivery has generally been conceptualized, heretofore, as a network function. This is, a system embodied in a network platform, such as a broadcast television network headend, generally made decisions concerning asset delivery and controlled insertion equipment to effect delivery. Consequently, such conventional systems had ready access to information concerning the assets available to be played on UEDs but little if any information related to asset delivery to a given user via different UEDs.

The present aspect of the invention implements decisioning via an architecture that is more independent of the UED network and more readily applicable across multiple devices, networks and modalities. The associated functionality involves instructing a UED to store assets of an asset set at a memory structure of the UED (physically embodied in the UED or otherwise accessible by the UED). For example, an asset decisioning system may instruct the UED to store a set of assets that are deemed likely to be selected for delivery based on a comparison of asset targeting constraints to classification parameters associated with the UED (e.g., demographic parameters, interests or purchasing behavior of a user or users of the UED). The decisioning system then receives an indication of the assets stored at the memory structure and transmits a playlist instructing the UED to deliver (e.g., play back) one or more of the assets at one or more ADOs. For example, the decisioning system may construct the playlist taking into account information concerning the current user or users (actual, estimated or estimated classification parameters), campaign specifications for the assets, and user impression information for the UED and/or other UEDs. In one implementation, the decisioning system is cloud-based and can access delivery information and/or control asset delivery across multiple devices, networks and modalities.

It will be appreciated that the invention encompasses the overall system and associated functionality as described herein as well as system components and corresponding functionality associated with each component or set of components, e.g., the node or nodes embodying the network-side of the system, each of the set of UEDs or combination thereof, servers or headend equipment, contracting platform, and other platforms involved in reporting asset consumption and/or associated user behavior.

BRIEF DESCRIPTION OF THE DRAWINGS

For a more complete understanding of the present invention and further advantages thereof, reference is now made to the following Detailed Description, taken in conjunction with the drawings, in which.

DETAILED DESCRIPTION

In the following description, the invention is primarily set forth in the context of addressable asset systems for selecting and delivering assets in television (broadcast, on-demand, streaming, etc.) and other networks. The assets may be, for example, video advertisements for delivery during advertising breaks in broadcast (cable, satellite, over-the-air, etc.) programming, product placement in broadcast programming, advertisements for internet delivery (video, images, text, etc.), public service announcements, network announcements or other content.

The invention is described in relation to implementations where the asset decisioning system is independent of (is not dependent on) the content delivery systems and asset download systems of the network. In addition, in certain embodiments, the invention is described in relation to monitoring asset delivery and making asset delivery decisions in addressable-asset environments involving multiple devices, multiple networks and/or multiple modalities. However, the invention is not limited to such contexts, e.g., certain aspects of the invention are advantageous even in the context of managing and monitoring asset delivery for a single device, network and modality or in connection with asset decisioning systems that are integrated with or dependent on the network delivery systems.

The invention is first described below in connection with a system architecture including an independent asset decisioning system. Exemplary implementations for managing and monitoring multiple devices in a single network are then described. Thereafter, a system is described for managing and monitoring asset delivery in a multi-network environment. Finally, a number of use cases for the inventive systems are described.

I. Single Device

Figure 1:
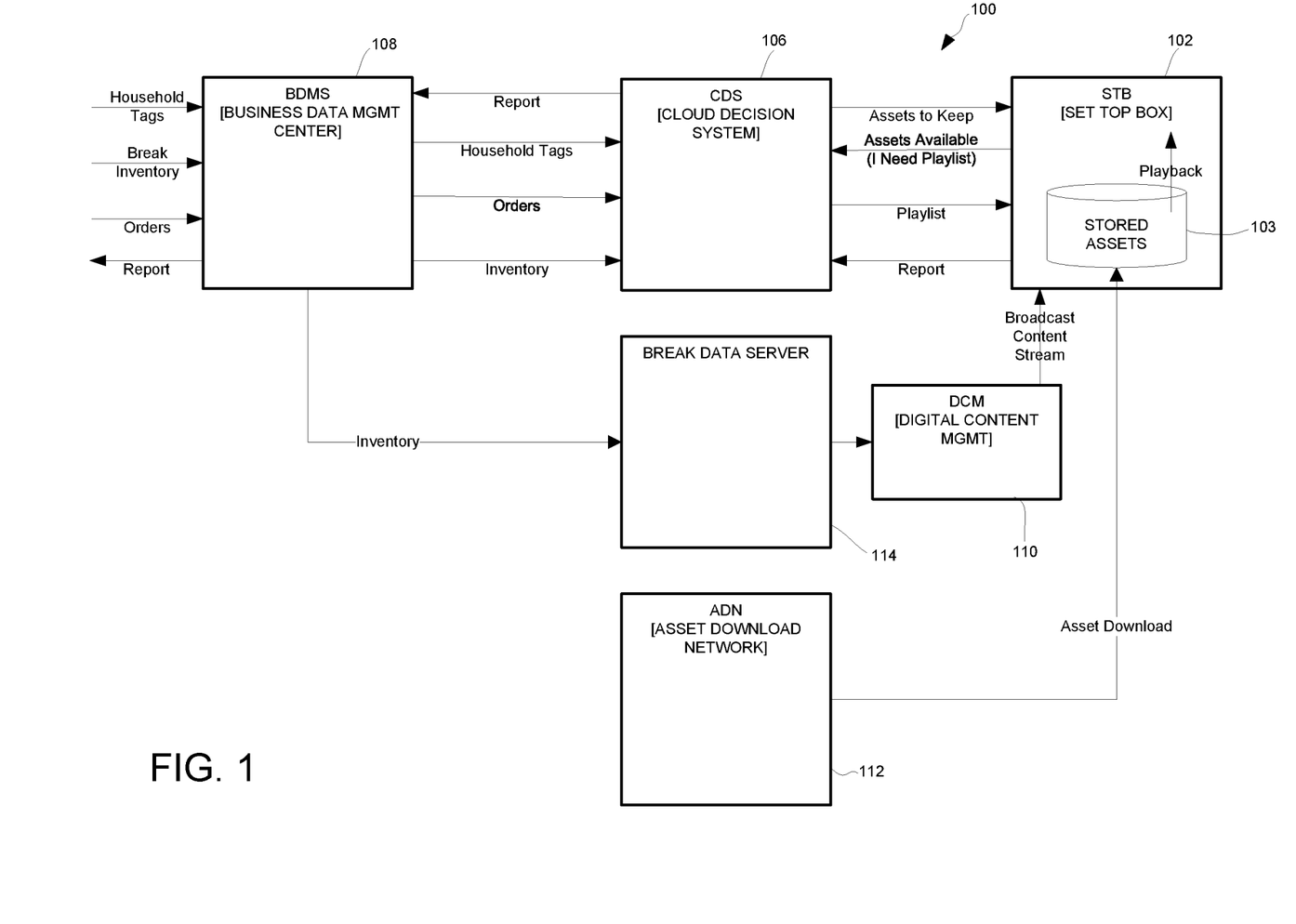
FIG. 1 is a schematic diagram of an addressable asset system in accordance with the present invention.

FIG. 1 illustrates an addressable asset system 100 in accordance with the present invention that manages and monitors asset delivery with respect to individual UEDs 102 although only one UED 102 is illustrated, and the management/monitoring functionality is implemented on a per UED basis, the network would generally include many UEDs. As will be understood from the description in the sections below, the invention is applicable with respect to a variety of types of UEDs in various networks utilizing various modalities. In the illustrated embodiment, the UEDs 102 are televisions, for example, associated with a cable or satellite television network.

As will be understood from the description below, the UEDs 102 are capable of receiving, decoding and displaying a selected band of a broadcast content stream (e.g., a digital stream including one or more programming channels) and accessing a data platform to download asset files (e.g., digital media files) for storage in a storage unit 103 of the UED 102. The UED 102 may also be capable of accessing on-demand or streaming video content from the broadcast network or a data network such as the internet. The UED 102 may thus be embodied in one or more machines such as a smart television, a set top box, a DVR, an external computer and/or an external storage device. The storage unit 103 may include disk drives, solid state storage devices or other storage structure. The UEDs 102 can deliver assets in connection with broadcast, on-demand and streaming programming with suitable adjustments, e.g., to identify ADOs.

It will be appreciated that the ability to deliver addressable assets in connection with broadcast networks is advantageous due to both the value of asset delivery in these networks and the difficulty of delivering addressable assets in connection with the broadcast mode. Addressable asset systems generally allow for delivery of selected assets for individual UEDs, users or groups of users based on classification parameters of those users which may include, for example, demographic attributes; psychographic attributes; a present, residence, or other location of a user; income, purchasing behavior or other financial information of a user; viewing, browsing or other network behavior; interests or other lifestyle factors; or other parameters of interest to an asset provider, network provider, sociologist, researcher, or other interested party. In some implementations, assets can be selected for individual users based on matching targeting constraints and other campaign specifications for an asset to classification parameters and impression information of the user or UED.

However, it will be appreciated that the invention is not limited to such addressable asset contexts. For example, while executing decisions for asset delivery, e.g., to take into account campaign specifications such as frequency and total impression count, may involve device level insertion functionality, such execution does not necessarily entail matching of classification parameters to corresponding asset targeting constraints. Asset providers may desire that even untargeted assets are delivered in accordance with certain campaign specifications, e.g., related to frequency, overall impression count or sequencing of related assets.

Addressable asset delivery systems are described in the following U.S. patents and applications that are incorporated herein by reference: "U.S. patent application Ser. No. 09/877,718, entitled "Targeted Impression Model for Broadcast Network Asset Delivery," ("the Invidi I application"); "U.S. patent application Ser. No. 11/331,835, entitled "Targeted Impression Model for Broadcast Network Asset Delivery," and now issued as U.S. Pat. No. 8,108,895 ("the Invidi II application"); "U.S. patent application Ser. No. 14/949,442, entitled "Targeted Impression Model for Broadcast Network Asset Delivery" ("the Classifier application"); "U.S. patent application Ser. No. 12/024,696, entitled "Targeting Content Based on Location," and now issued as U.S. Pat. No. 8,850,473 ("the Location application"); "U.S. patent application Ser. No. 12/024,714, entitled "Compensating for Ad-skipping in a Communications Network" ("the Asset Skipping application"); "U.S. patent application Ser. No. 12/467,890, entitled "Compensating for Ad-skipping in a Communications Network," and now issued as U.S. Pat. No. 8,146,126 ("the Request for Information application"); "U.S. patent application Ser. No. 12/022,209, entitled "Asset Targeting System for Limited Resource Environments," and now issued as U.S. Pat. No. 7,849,477 ("the Limited Resource application"); "U.S. patent application Ser. No. 13/870,870, entitled "Third Party Data Matching for Targeted Advertising," ("the Third Party Data Matching application"); "U.S. patent application Ser. No. 13/673,869, entitled "Targeted Advertising in Unicast, Multicast and Hybrid Distribution System Contexts" ("the Multicast application"). While the present invention sets forth, among other things, alternate decisioning systems, asset delivery networks and protocols, and asset management and monitoring functionality, the above-noted patents and applications disclose structure, functionality and considerations that are relevant to the present invention. Those include, by way of example, subject matter related to identifying a current user or classification parameters thereof, matching classification parameters to targeting constraints, reporting delivery of assets, determining user presence and engagement, and identifying asset skip or tune-away events among others.

Returning to FIG. 1, the illustrated system 100 includes, in addition to the UEDs 102, a cloud decisioning system (CDS) 106 and a business data management system (BDMS) 108. The BDMS 108 generally collects a variety of information that is used by the CDS 106 to manage delivery of assets by the UEDs 102 and provides information useful for billing and analysis. The CDS 106 and BDMS 108 may be embodied in logic executed on one or more platforms, e.g., web servers, and may run at least in part on the same machines or on different machines. While the CDS 106 is referred to as a "cloud" decisioning system, and may be implemented as a cloud-based system accessed via IP Networks, it will be appreciated that neither the CDS 106 nor other systems referenced herein are limited to a specific network environment.

The illustrated BDMS 108 intakes information concerning household tags, break inventory, and orders. The household tag information may include the classification parameters noted above for each household or individual members of households. At least the Invidi I, Invidi II, Classifier, Limited Resource, Multicast and Third Party Database cases referenced above describe systems that distinguish between household members in this regard. The household tag information may also include location information associated with the user, such as an address of the user or current location of the UED 102. This is described at least in the Location case. This information can be used by the CDS 106 to match the UEDs 102 and/or individual users of the UEDs 102 to the targeting constraints for individual assets (e.g., male, age 21-34, with an income of at least $50,000). This information may be obtained from a variety of sources, including third party databases (such as those of credit agencies such as Experian™) and logic associated with the UEDs 102 and may be used in combination with information of customer databases of network providers (e.g., the cable or satellite TV provider).

The break inventory information identifies at least particular upcoming ADOs that will be managed by the CDS 106. As noted above, ADOs may be spots in commercial breaks on particular television channels ("asset spots"), product placement opportunities within programming, television crawls or pop-ups, internet/IP advertising or other opportunities. An important category of ADOs that can be managed by the CDS 106 in the context of television networks is asset spots. In this context, it may be the case that only certain asset spots are designated by the appropriate stakeholders (e.g., programming networks, local affiliates, etc.) as having assets that may be inserted/replaced, or are otherwise available to be managed by the CDS 106. Those spots may be identified in the break inventory information. The ADOs identified in the break inventory information may also include ADOs of, for example, on-demand programming. In such cases, the break inventory information may not identify the ADO by time (which may not be known) but by another index identifying the relevant ADO (e.g., it may be known that the on-demand content includes three identified breaks, and an ADO of interest may be identified as the second break). Thus, the break inventory information may identify individual ADOs by reference to programs, channels, times, other break indices, etc. Such information may be obtained from data systems of programming networks, network providers or others.

The order information will generally include information defining asset campaigns. As further described above and below, as well as at least in the Invidi I, Invidi II, and Third Party Database applications, such information may relate to delivery constraints such as targeting parameters (e.g., demographics of the target audience), channel or program exclusions, proximate asset exclusions, specified channels or programs, specified times and dates (or ranges thereof), frequency of delivery (e.g., how often an asset may be delivered to a particular user), pacing (at what pace should the total number of impressions be fulfilled, e.g., 10 impressions per week), total number of impressions (e.g., how many times an asset may be shown to a particular user), sequencing or other prerequisite information (e.g., asset B should only be shown after asset A has been delivered five times, or asset B should only be shown after asset A was delivered/interacted with on the internet), other contingencies (e.g., show this asset in the event of a particular outcome of a sporting event or in certain weather conditions), or other constraints. This information may be obtained at least in part from a contracting platform where asset providers or others enter asset delivery requests. Additional information may be obtained from other network platforms and operators having access to the relevant information.

The BDMS 108 may also receive report information from the CDS 106 and output information to interested parties. The output report information may be the same as the report information received from the CDS 106 or may be processed, e.g., aggregated, condensed, edited, sorted, supplemented, sanitized in relation to privacy concerns/rights of the receiving party, and/or selected responsive to a query. The CDS 106 receives reports from devices 102 across one or more networks related to asset delivery. As set forth herein and at least in the Invidi I, Invidi II, Asset Skipping, and RFI cases, such reports may indicate what asset was delivered and for what ADO is was delivered (e.g., channel and time), and may also provide information concerning incomplete deliveries (e.g., asset skips, tune-aways, mutes, etc.), user presence and engagement, active engagement (e.g., requests for information or clicks), subsequent purchasing behavior, or the like. The CDS 106 may aggregate this information, combine this information with other data (e.g., subsequent purchasing data, network data, or click stream analysis data) or otherwise process the data before forwarding report information to the BDMS 108.

The reports provided to the CDS 106 and output by the BDMS 108 may be used for a variety of purposes. For example, the reports may be used to determine the total number of impressions delivered, and the break-down of impressions for different channels and breaks, for purposes of billing asset providers and sharing revenues. In addition, the reports may be used to determine the extent to which different asset delivery requests have been fulfilled so as to inform subsequent delivery decisions by the CDS 106. The reports including, for example, the number of asset skips and tune-aways, may be provided to asset providers and others to analyze asset effectiveness. In this regard, audience classification information, for particular users or aggregated, may be provided with the reports so that the recipient can determine what types of users skipped assets or tuned-away. The reports may also be provided to various other researchers interested in behavior patterns of network users.

As will be appreciated from the foregoing discussion, the CDS 106 is operative to make decisions concerning what assets will be delivered at the UEDs 102, 104 in connection with ADOs. FIG. 1 illustrates an exemplary network architecture where the CDS 106 is independent of the network insertion and delivery equipment. In particular, the broadcast content stream is delivered to the UED 102 by a digital content management (DCM) system 110 and certain assets are separately delivered to the UED 102 by the asset download network (ADN) 112. Neither the DCM 110 nor the ADN 112 is directly controlled by the CDS 106 in the illustrated system 100, nor is the CDS 106 dependent upon the specific identification of the DCM 110 and ADN 112. As will be discussed below, this allows the CDS 106 to remain independent of the network of the UED 102 such that the CDS 106 can operate across networks.

In the case of the illustrated broadcast television network, the broadcast content stream may include multiplexed television channels, delivered by cable or satellite, and assets. In the latter regard, for example, only certain asset spots on certain channels may be designated for replacement with assets as controlled by the CDS 106. Those spots may be identified by cue messages inserted into the broadcast content stream signifying to the UED 102 that an ADO is coming. Such cues may be provided shortly before, e.g., a few seconds or less prior to, the spot at issue. The remaining spots generally would not be identified by cue messages and would be indistinguishable from the surrounding programming stream from the perspective of the UEDs 102. Even the spots identified by cue messages as being available for asset insertion at the UEDs 102 may have default assets included in the broadcast content stream for more efficient bandwidth usage and reduced processing (e.g., an asset expected to be appropriate for a large segment of the audience may be selected as the default asset so that device implemented asset substitution is minimized).

The DCM 110 may be embodied in satellite network or cable network distribution platforms such as headend equipment, node equipment or the like. The DCM 110 receives the broadcast content from various sources and multiplexes the content for transmission to the UEDs 102. The DCM 110 also includes the noted cue messages in the broadcast content stream. In this regard, the DCM 110 receives information identifying the relevant ADOs from the break data server 114. For example, such information may identify specific spots on specific channels that are available for asset replacement under control of the CDS 106. The break data server 114 obtains inventory information from the BDMS 108 concerning these ADOs.

The ADN 112 has access to stored assets that can be downloaded to the UEDs 102. For example, the ADN 112 may store media files for all asset options that may be delivered by the UEDs 102. Those files may be provided, for example, by asset providers or agents thereof. In response to a request from a UED 102, for example, including identifiers for designated assets, appropriate media files may be downloaded to the UED 102 for storage in storage until 103 of the UED 102. The ADN 112 may be embodied in one or more servers that communicate with the UEDs 102 via a data network such as the internet.

In operation, the BDMS 108, from time-to-time, sends updated household tag, orders and inventory information to the CDS 106. This may be done periodically, otherwise on a scheduled basis, as updates occur, or on another basis. Based on this information, the CDS 106, in the illustrated system 100, instructs the UEDs 102 as to what assets to store. For example, in a multi-member household, the CDS 106 may compare tag information for each household member to targeting constraints for each asset (as indicated by the orders information) to identify a list of assets that may be played at the UED 102. Such lists may be forwarded to the UEDs 102 on a periodic or other basis, and used by the UEDs 102 to select assets to be stored for potential playback at a later time. The assets may be identified in the list by codes or other identifiers adequate to identify the assets.

The manner of storing the assets at the UED 102 can vary depending on the network implementation. For example, if assets are transmitted to the UEDs via a broadcast protocol, it may by convenient to transmit all assets to all UEDs 102 within a given network subdivision and then instruct each UED 102 to only store assets on its list and discard others to save storage space. The illustrated IP-based system is advantageous in that each UED 102 can request and receive, from the ADN 112, only the assets on its list. It should be noted that, while convenient and practical, it is not necessary that the assets be provided ahead of time and stored versus being transmitted in real-time at an ADO. Assets may be transmitted at play time where bandwidth and processing capabilities allow.

However, in the illustrated implementation where assets are provided to the UEDs 102 ahead of time, the operation of the system 100 proceeds by having the UED 102 request a playlist. In this regard, the playlist may be different from the list of assets to store for a number of reasons. First, the CDS 106, which may be independent of broadcast network, does not necessarily receive and forward to the UEDs 102 all information for each asset concerning asset delivery constraints, e.g., targeting constraints, network and programming constraints, etc. Accordingly, while the UED 102 has assets available, it does not necessarily know what assets are appropriate for a given UED. Moreover, in a multiple member household where assets are stored for different household members, the UED 102 may not know which member or members are present for receiving assets. That is, depending on the implementation, the UED 102 may or may not have logic for determining which users are present. If it does, this information may be provided to the CDS 106 or may potentially be used for at least partially autonomous asset selection by the CDS 106. The illustrated implementation, however, allows for delivery of addressable assets, including delivery of individually targeted assets in a multimember household, without requiring logic at the UED 102 for identification of a current user. Such identification may be performed by the CDS 106 based on the household tag information.

The illustrated CDS 106 also does not necessarily know when an ADO is about to occur at the UED 102. The CDS 106 does not necessarily know if the UED 102 is turned on, what channel it is turned to and, even if it had access to such information, does not necessarily know when breaks will occur or what spots are available for asset replacement. Moreover, though the illustrated CDS 106 has instructed the UED 102 as to what assets to store, the CDS 106 does not necessarily know what assets are available to be played at the UED 102. The UED 102 may not yet have stored the assets as instructed, the assets may have subsequently been deleted for various reasons (e.g., change in household composition, changes in constraints or preferences, storage limitations, etc.), or the assets may otherwise be unavailable for the ADO at issue.

Accordingly, in the illustrated implementation, the UED 102 informs the CDS 106 what assets are available and requests a playlist. This may be done in a single message between the UED 102 and the CDS 106 or in separate messages. For example, the assets available may be updated continually as assets and stored or deleted. However, in one implementation, the UED 102 reports what assets are available at the same time as it requests a playlist. The request may be for a single ADO, a set of related ADOs, or otherwise for multiple ADOs. Preferably, the request is for a single or small set of ADOs and is made close in time, e.g., seconds or fractions or seconds, before the beginning of the ADO. It will be appreciated that requests made close to the time of the ADO are most useful due to channel changes, the potential that the UED 102 will be powered off, etc.

The request may include, in addition to identifying what assets are available at the UED 102, information identifying the ADO. For example, the information may be sufficient to enable the CDS 106 to select assets taking into account any delivery constraints (e.g., program or channel inclusions/exclusions) and campaign information (e.g., frequency and overall impression count). It will be appreciated that monitoring of information related to asset selection decisions could be distributed in various manners between the CDS 106 and the UEDs 102 (e.g., the UEDs 102 could count total number of impressions delivered for an asset). In the illustrated implementation, substantially all aspects of monitoring and decision-making are executed at the CDS 106. This reduces the need for specialized logic/resources at the UEDs 102, allows the system 100 to be deployed without upgrading the UEDs 102, and allows the CDS 106 to operate independent of the specific attributes of the UEDs 102 which facilitates operation across all UEDs of a network and across networks.

The CDS 106 then provides a list of one or more assets to play at one or more ADOs. In the simplest case, this may be an instruction to play a specific asset (e.g., identified by a code or other identifier) at the immediately ensuing ADO. However, it is also possible for the playlist to include alternate assets for different channels/ADOs (e.g., in case of channel change) or alternate assets for a single ADO, or parameters for controlling the UED 102 to select the asset. In any case, the UED 102 plays an asset from the storage unit 103 response to receiving the playlist. For example, the UED 102 may commence playback from storage 103 based on a detected cue message in the broadcast stream.

The UED 102 and/or CDS 106 may then monitor delivery of the asset at the UED 102. It is possible to implement the system 100 such that, once asset delivery begins, it continues regardless of channel charges, fast-forward commands (e.g., in the case of on-demand or time-shifted contexts) or the like. However, in one implementation, the UED 102 monitors asset skips or time-aways. The UED 102 or CDS 106 may also monitor other information such as user presence and engagement, muting, volume, any requests for information entered in relation to an asset or the like. Some or all of this information may be provided in a report sent from the UED 102 to the CDS 106. Such reporting is described at least in the Invidi I, Invidi II, and Asset Skipping cases. For example, a report may include, for each ADO, an identification of the asset delivered, an indication of the time of delivery, an indication of the channel or program in connection with which asset was delivered and, optionality, additional information such as completeness of asset delivery and presence/engagement information. These reports may be sent for each ADO or aggregated for periodic transmission. Moreover, the reports may be collected for each ADO for each UED 102, or a statistical reporting process may be implemented. In turn, the CDS 106 may provide report information based on the reports from the UEDs 102 to interested parties as described above.

While much of the preceding discussion has focused on asset delivery in the context of linear, broadcast content. It will be appreciated that the system 100 is applicable in other contexts such as on-demand, time-shifted playback at the UED 102, linear to on-demand, streaming, etc. In any such contexts, ADOs can be detected by the UED 102 based on cue messages or other means. Assets (in the appropriate format) can be stored and delivered as described above, including playlist requests, reports, etc. Again, as the CDS 106 need not be integrated into the context delivery systems, much of the functionality is independent of the ADO context.

Figure 2:
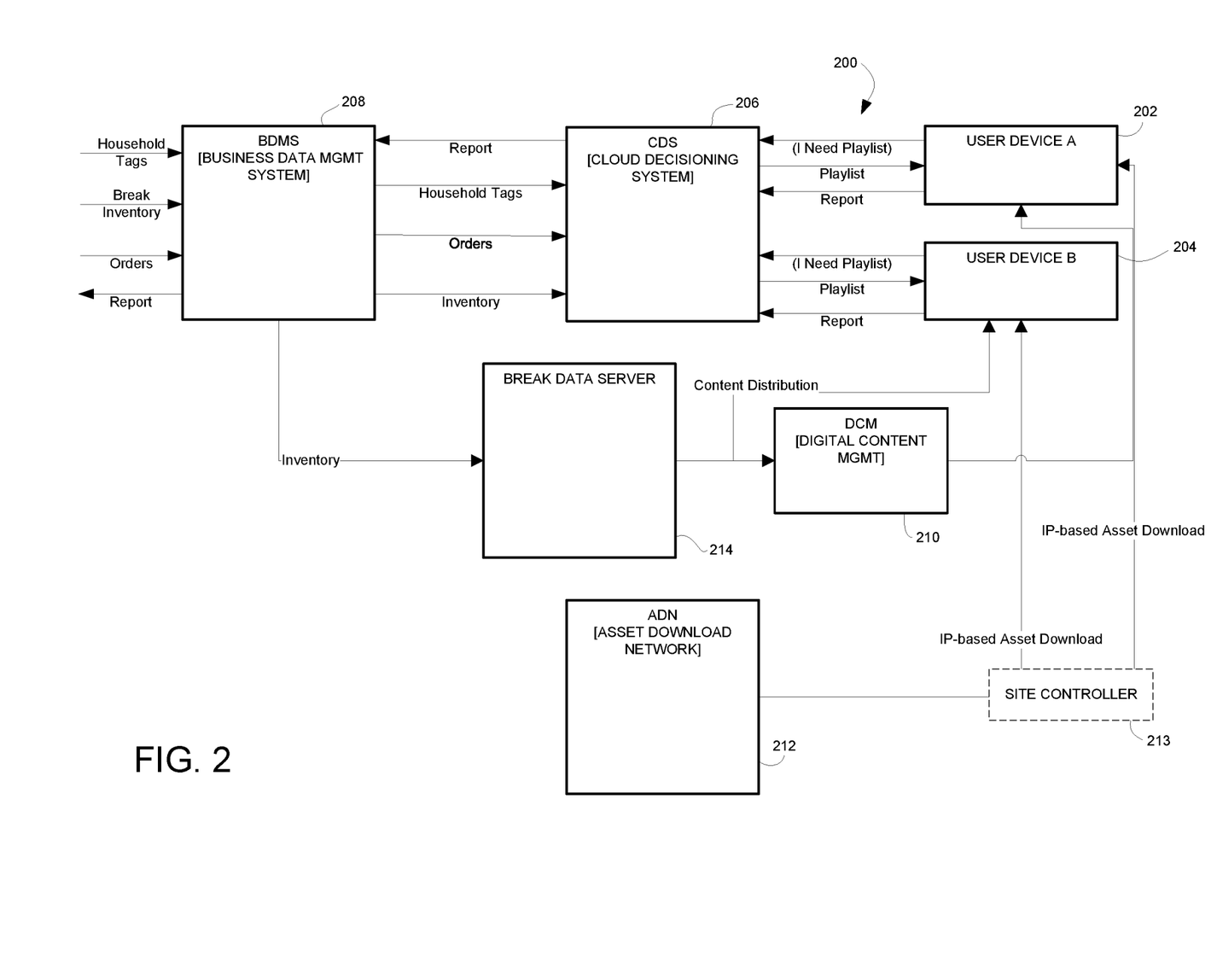
FIG. 2 is a schematic diagram of an alternative implementation of an addressable asset system in accordance with the present invention.
Figure 3:
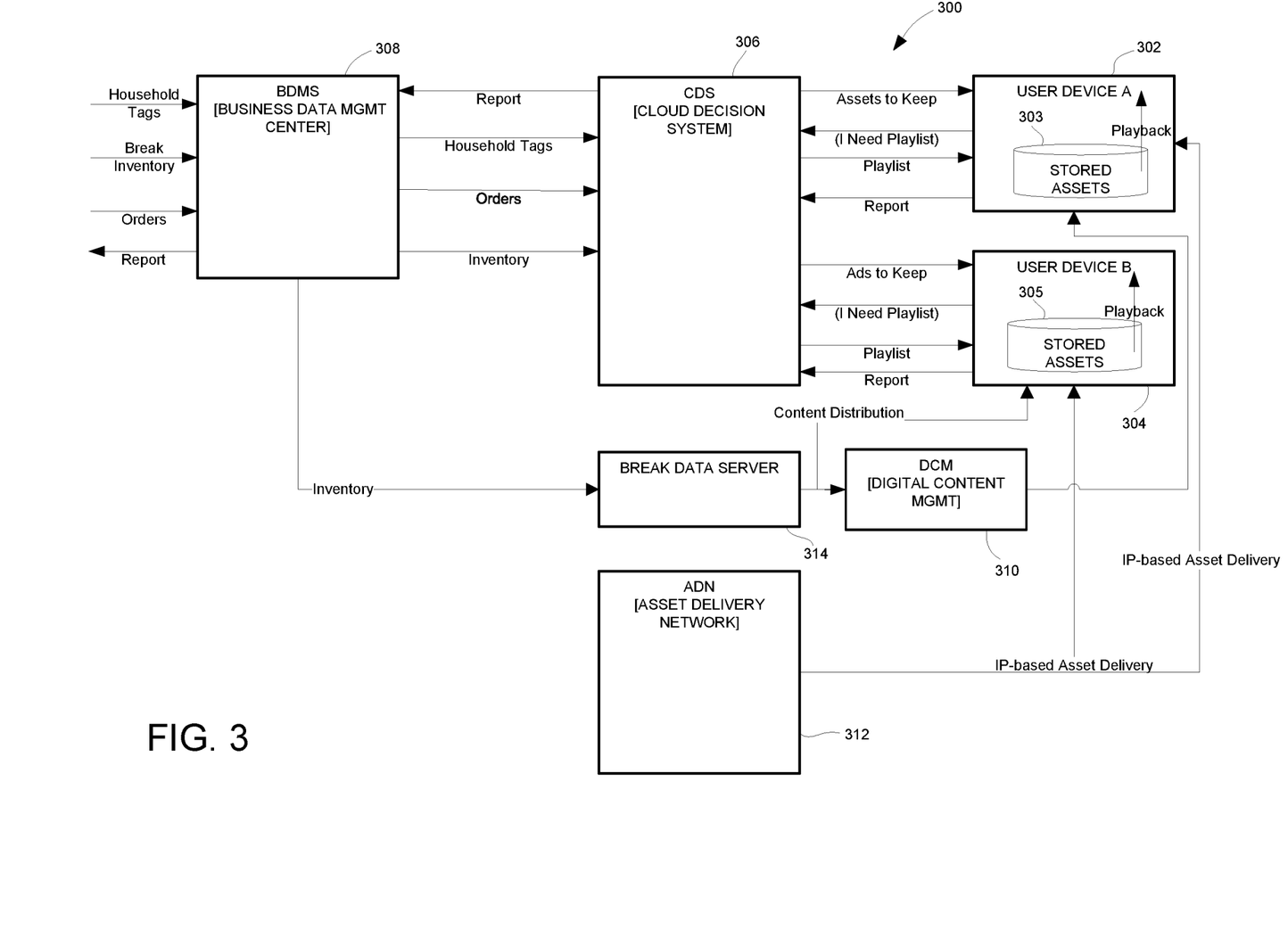
FIG. 3 is a schematic diagram of a still further alternative implementation of an addressable asset system in accordance with the present invention.

FIGS. 2-3 illustrate alternative systems 200, 300 for implementing addressable asset delivery where asset delivery can be managed across multiple UEDs 202, 204 and 302, 304. Although two UEDs 202, 204 and 302, 304 are shown in each case, delivery of assets can be managed across substantially any number of UEDs subject to practical limitations. The UEDs 202, 204 and 302, 304 may be the same or different, may be in the same location or different locations, and may be part of the same network or different networks. The present embodiments focus on the case where the UEDs 202, 204 and 302, 304 are in the same location and are part of the same network, e.g., different televisions in the same residence. It will be appreciated that this is an important case as a user may receive assets via different televisions within a household and it may be useful to manage asset delivery, including frequency and total number of impressions, across those devices.

The structure and functionality of the systems 200, 300 can be substantially the same as described above in connection with FIG. 1 except for the structure and functionality specific to multiple devices. In this regard, the systems 200, 300 include BDMSs 208, 308, CDSs 206, 306, break data servers 214, 314, DCMs 210, 310, and ADNs 212, 312, all substantially as described above.

The principal difference between the systems 200, 300 of FIGS. 2 and 3 is that the UEDs 302, 304 of FIG. 3 are each depicted as having asset storage units 303, 305 whereas the UEDs 202, 204 of FIG. 2 do not. There are a number of contexts where assets may not be stored locally on each UED 202, 204. For example, storage may be provided by a single, optional site controller unit 213 that is networked to the UEDs 202, 204. For example, the site controller 213 may be located at the same location as the UEDs 202, 204 (e.g., at the same residence) or at another location and may be embodied as an external storage unit, a master set top box, or the like. Local storage at each device 202, 204 also may not be necessary in on-demand contexts (e.g., if the CDS 206 directs the on-demand platform to insert assets) or where replacement assets are delivered by the ADN 212 in real-time. It will be appreciated that, in contexts where the UEDs 202, 204 do not have local storage units, the UEDs 202, 204 will not receive a list of assets to store (though a site controller 213 may get a corresponding list applicable to the UEDs 202 and 204). The UEDs 202, 204 may still request playlists and provide reports.

There are a number of housekeeping functions that can be addressed to manage asset delivery across multiple UEDs 202, 204 or 302, 304. First, the CDS 206, 306 can maintain lists of related UEDs 202, 204 and 302, 304, e.g., lists of devices designated for collective management. In this regard, each UED 202, 204 and 302, 304 can be identified by a MAC address or other identifier and those identifiers can be used to compile the lists and used in communications (e.g., playlist requests, reports, etc.). In cases where asset delivery is managed for multiple individuals associated with one or more devices, individuals may also have identifiers for use by the CDSs 206, 306 (this would also be the case even for managing a single device). The individuals may be identified by the CDSs 206, 306, e.g., based on the household tags and network usage information, and will not necessarily need to be identified in playlist requests, reports, etc.

In any case, asset deliveries or partial deliveries on either device 202, 204 or 302, 304 can be reported to the CDS 206, 306 and recorded against the collectively managed entity defined in terms of a user or users and multiple devices. For example, if a given user received an asset three times via UED 202 and two times via UED 204, the CDS 206 may record that the user has received the asset five times. These collectively analyzed reports can be used to manage compliance with campaign specifications such as frequency and total number of impressions.

Figure 4:
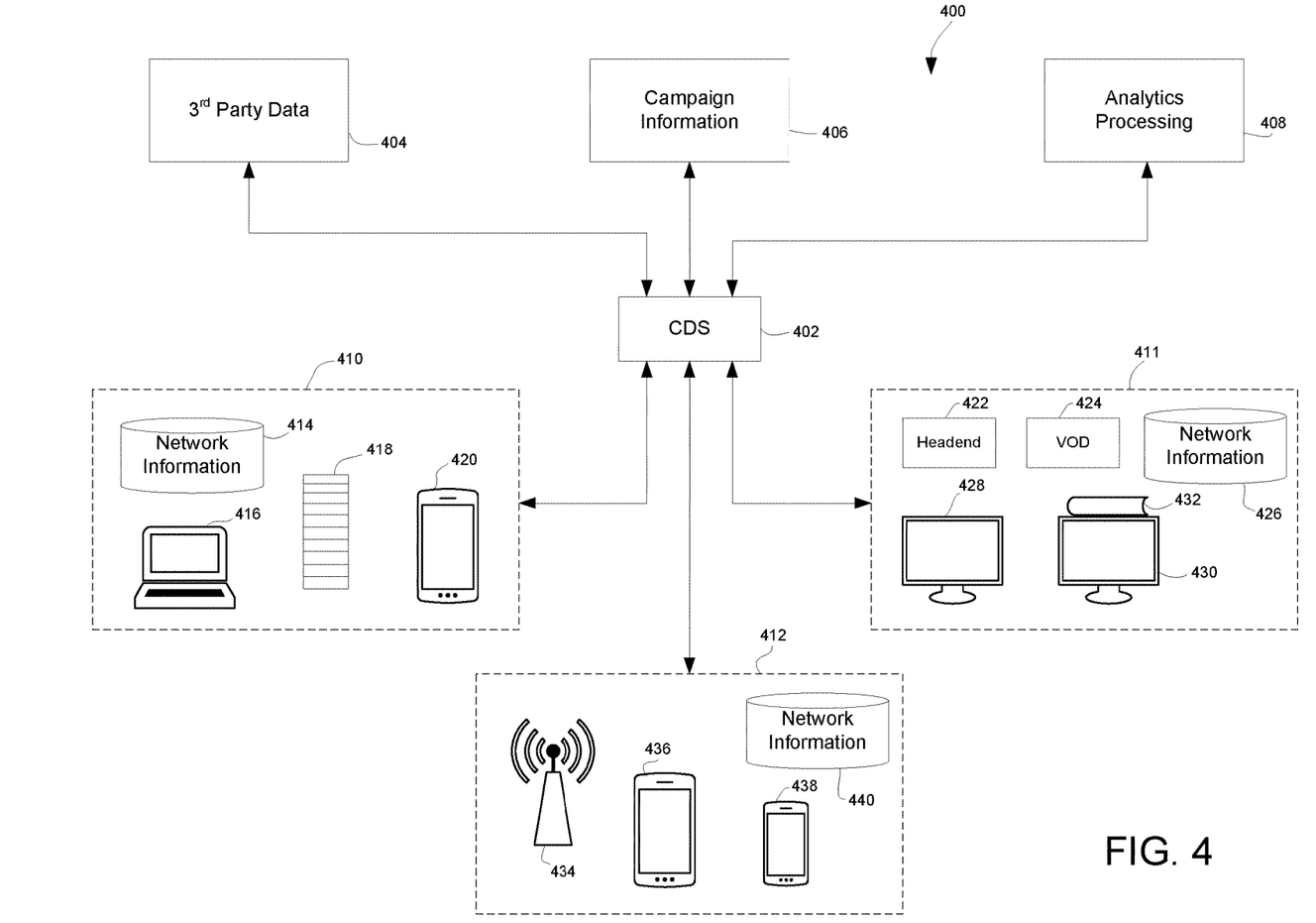
FIG. 4 is a schematic diagram of a decisioning system in a multi-network environment in accordance with the present invention.

FIG. 4 illustrates and addressable advertising system 400 that can be used to manage delivery of assets across multiple devices and multiple networks. The illustrated system 400 includes a cloud-based decisioning system (CDS) 402 that manages decision making for asset delivery across multiple UEDs. The illustrated CDS 402 receives information from a variety of sources including a third-party database 404 and a campaign information platform 406 and can provide output information to an analytics processing platform 408. The CDS 402, in turn, controls asset delivery with respect to UEDs in multiple networks 410-412.

The third-party database 404 can provide a variety of information that is useful in targeting assets to particular subscribers and evaluating the effectiveness of assets. For example, the third-party database 404 can be accessed to obtain demographics information, income information, purchasing behavior information or the like for individuals and households. This information may be indexed to a residence address or an identification of an individual. This information may be used in connection with network information 414, 426, 440 from the networks 410-412 to correlate the information from the third-party database 404 with particular users or households of the networks 410-412.

The information from the third-party database 404 may be used to match individual users or households to targeting constraints of assets, or to track activities subsequent to asset delivery to analyze asset effectiveness. For example, information concerning income, brands of products purchased, age, gender, data network behavior, occupation or the like may be used to match users or households to targeting constraints of assets prior to asset delivery. Information from the third-party database 404 concerning purchasing decisions, website visits, or other behavior may be used to track asset effectiveness after delivery.

Although a single third-party database 404 is shown for purposes of illustration, such information may be obtained from multiple data sources associated with multiple entities. Examples include credit agencies like Experian™, sources of website traffic data, loyalty programs of retail outlets, and other customer information databases. For example, an asset provider, such as Ford Motor Company, may seek to target assets to current Ford owners on the networks 410-412. Delivery of the assets on the networks 410-412 may then be tracked to achieve a desired level of campaign fulfillment. Thereafter, behavior of the network users may be tracked via the third-party database 404 to determine how many users of the networks 410-412 who receive the asset in question purchased Ford products or third-party products. In this manner, asset delivery across the networks 410-412 is precisely targeted and tracked, and subsequent behavior is analyzed to close the loop concerning asset effectiveness.

The CDS 402 also receives campaign information 406 regarding campaigns for various assets. As discussed above, campaign information may include targeting constraints defining the targeted audience as well as campaign constraints defining various parameters of a campaign such as the date range of the campaign, the desired networks or programming associations of the asset, the frequency of asset delivery, pacing, and the total number of impressions to be delivered. In the context of the illustrated system 400, such campaign information may also define campaign constraints specific to the multi-network environment. For example, the campaign information 406 may specify that, for example, a broadcast network asset should only be delivered after a particular user has received an internet asset, or that a particular user should receive an internet asset a certain number of times, a wireless asset a certain number of times and a broadcast network asset a certain number of times. The CDS 402 is operative to monitor such deliveries across networks to ensure campaign fulfillment.

The analytics processing platform 408 can receive information related to asset delivery for a variety of purposes such as billing, revenue splitting and analysis of asset effectiveness. In this regard, the CDS 402 can provide information to the analytics processing platform 408 periodically or in response to queries. For purposes of billing and revenue splitting, the information provided by the CDS 402 to the analytics processing platform 408 may include total number of impressions, an identification of the networks for which impressions were delivered, an indication of channels, websites, or other associations, or any other information relevant to billing and revenue sharing. In the case of analytics processing for asset effectiveness, the platform 408 may query the CDS 402 to obtain a variety of information related to a particular asset or set of assets. Appropriate security protocols may be implemented to ensure privacy and to ensure that information is only accessed by authorized parties.

As noted above, the CDS 402 can manage and monitor asset delivery across multiple networks 410-412. Many different types of networks may be managed and monitored in this regard. For purposes of illustration, FIG. 4 shows three networks; a data network 410, a broadcast network 411, and a wireless network 412. For example, the data network 410 may include computers 416, servers 418, and tablets 420 among other types of data terminals. The broadcast network 411 may include Smart TVs 428, TVs 430 associated with set-top boxes 432, headend equipment 422, and video on-demand equipment 424. The CDS 402 may communicate with any of these components to control and monitor asset delivery in the network 411.

The illustrated wireless network 412 may include cell cites 434, tablets 436, and telephones 438. The CDS 402 may also communicate with a wireless location platform of the network 412 or separate therefrom in order to obtain information concerning the locations of wireless units.

It will be appreciated that the same asset may be delivered across any of the networks 410-412. For example, a full video asset may be inserted into a broadcast content stream or delivered via streaming in the data network 410 or wireless network 412. In addition, related assets may be delivered via the various networks 410-412. For example, an asset provider may provide three related assets including a full video asset for delivery in the broadcast network 411, a panel asset for delivery via the data network 410, and a mobile unit optimized asset for delivery via the wireless network 412. The CDS 402 can recognize the appropriate asset based on the identification of the UED submitting a playlist request. The illustrated system 400 thus allows for management of a single campaign across multiple networks 410-412. In addition, the illustrated system 400 facilitates operation of a single contracting platform to reach multiple networks 410-412.

Figure 5:
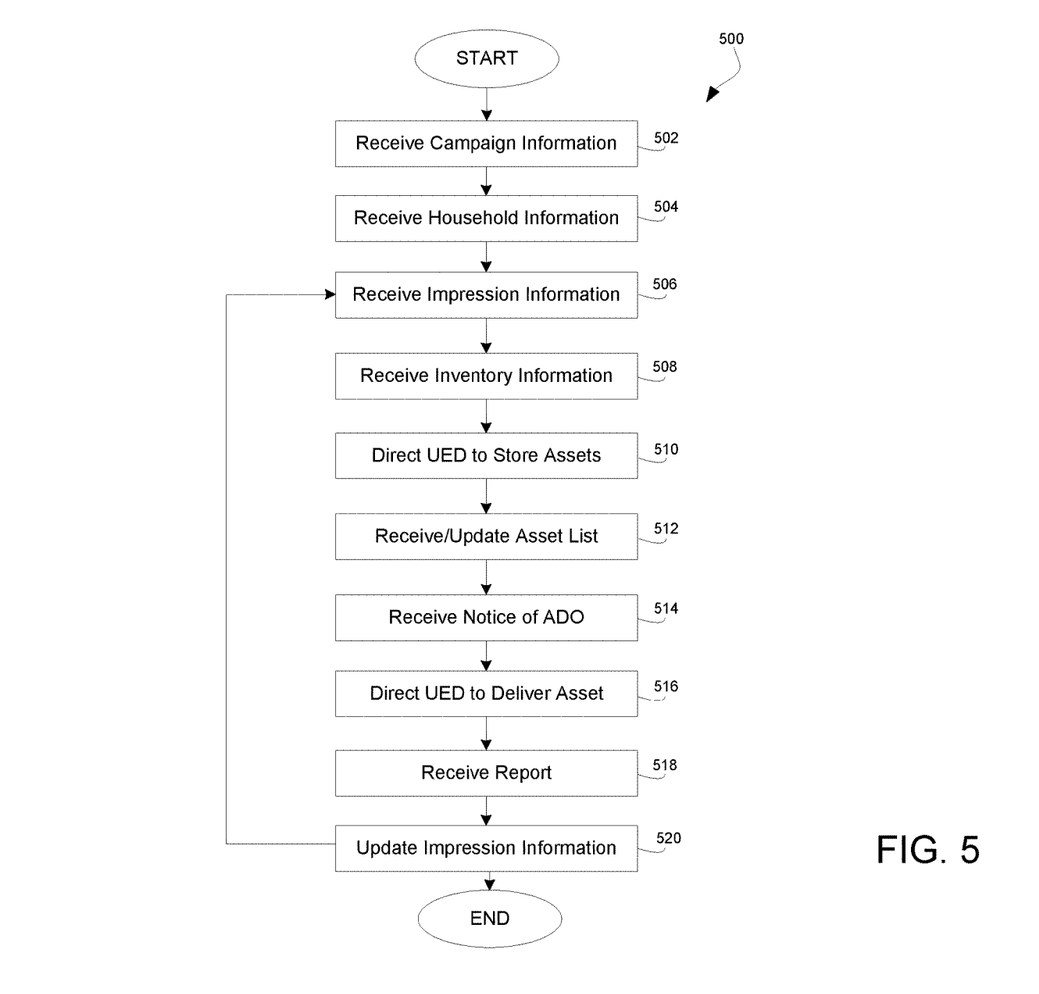
FIG. 5 is a flow chart summarizing a process for managing asset delivery across multiple devices, multiple networks and/or multiple modalities.

FIG. 5 is a flow chart illustrating a process 500 for managing and monitoring asset delivery in accordance with the present invention. The illustrated process 500 is initiated by receiving (502) campaign information defining a campaign for delivery of an asset or a set of assets. For example, the campaign information may be entered via one or more contracting platforms. In a preferred implementation, a single contracting platform can be utilized to enter information defining a single campaign extending across multiple networks.

A cloud decisioning system as described above can receive this campaign information as well as receiving (504) household information. The household information provides information concerning a household or individuals within a household that can be used to match households or individuals to the targeting constraints of an asset. As described above, this may include demographics, income information, purchasing behavior and the like. The CDS may also receive (506) impression information for an asset. For example, the CDS may receive reports from UEDs. These reports may indicate that an asset was delivered or partially delivered to a particular individual, household, UED, or type of UED. This information may be used by the CDS to determine a level of fulfillment of a campaign and, therefore, whether the asset remains available for delivery to a given UED or user.

The CDS may also receive (508) inventory information. Such inventory information may relate to, for example, the ADOs that are available for asset replacement or insertion. In the context of a broadcast television network, the inventory information may identify particular spots on particular programming networks where assets may be substituted into the broadcasting content stream. In the context of data networks or wireless networks, the asset delivery opportunities may relate to placement of video assets in streaming content, image-based assets on web pages, or other ADOs.

In certain implementations, the CDS may direct (510) the UED to store assets in advance of an ADO. As discussed above, storage units associated with particular UEDs or households in a broadcast television network may store assets that may be delivered in subsequent ADOs. Similarly, UEDs in data and wireless networks may be directed to store assets that will later be placed into asset placement spots of webpages or other content. In certain implementations, the CDS may occasionally receive and update (512) a list of assets that are available to be played at the UED. For example, as described above, individual UEDs of a broadcast television network may report to the CDS what assets are available to be played at the time that a playlist is requested. The CDS then receives (514) notice of an ADO. In this regard, a UED may contact the CDS to request a playlist for an upcoming ADO or set of ADOs. In respond, the CDS may direct (516) the UED to deliver a specified asset. For example, the CDS may provide a playlist to the UED identifying one or more assets to be played in connection with one or more ADOs. After one or more assets have been delivered by the UED, the UED may provide and the CDS may receive (518) a report concerning asset delivery. The report may indicate the asset that was delivered, the time of delivery, whether delivery was complete, what channel, website or other content the asset was delivered in connection with, and the like. The CDS can then update (512) impression information for the particular asset and for the particular user or UED that delivered the asset. The updated impression information can then be used to evaluate fulfilment of the asset campaign.

The implementations as described above in connection with the various embodiments can be used to support a number of use cases. A number of these use cases are set forth below for purposes of illustration. It will be appreciated that many other use cases are possible in accordance with the present invention.

The first use case, and perhaps the simplest use case, relates to managing and monitoring asset delivery via a single UED of a single network. This generally corresponds to the system shown in FIG. 1 above. In this case, the UED notifies the CDS of an upcoming ADO. In response, this CDS provides a playlist identifying an asset to be delivered in connection with the ADO. The UED then delivers the asset and reports delivery to the CDS. The CDS can track delivery based on the reports to determine a level of fulfilment of a campaign. While other architectures could be employed to track asset delivery, it will be appreciated that the noted architecture enables the CDS to manage and monitor asset delivery independent of the content delivery networks.

A second use case relates to managing and monitoring asset delivery across multiple devices of a single network. This generally corresponds to the embodiments described in connection with FIGS. 2-3 above. For example, this is useful to track delivery of assets to a single individual who used multiple UEDs in a single network, e.g., multiple televisions in a single household or multiple households of a network.

In this case, the CDS can use stored information concerning relationships between UEDs and/or report information to determine collective information concerning impressions delivered via different UEDs of the network. For example, if a given user receives an asset three times on a first UED and two times on a second UED, the CDS can properly track that the user has received the asset a total of five times. Similarly, if each report includes time of delivery information, the CDS can ensure that the user receives the asset on different UEDs only in compliance with frequency constraints.

The system can also manage and monitor asset delivery across multiple UEDs of multiple networks. In this regard, for example, the CDS may identify deliveries of an asset to an individual on different UEDs in different networks (including assets delivered at the same or at overlapping times, e.g., in a two screen consumption context such as simultaneous television and tablet use) based on stored information relating the UEDs and/or report information. In this manner, impressions delivered on the different UEDs of the different networks to a single user may be combined to ensure compliance with campaign constraints. For example, in the case of TV Anywhere programs, the CDS may determine that a user has received an asset twice in linear television programming and once more during program streaming on a tablet or laptop computer. Accordingly, the CDS may determine that the user has received three impressions for the asset. Similarly, the CDS may determine that a user has received an asset twice during linear television programming and once more via streaming in an unrelated network. Again, the CDS can combine these impressions to ensure compliance with campaign constraints.

The system can also be used to manage compliance with certain sequencing constraints concerning an asset or set of related assets. For example, an asset provider may specify that a first asset should be viewed a certain number of times, then a second asset should be delivered a certain number of times and then a third asset should be delivered a certain number of times. Asset delivery can be monitored by the noted system to ensure that the desired sequence is implemented.

As a further example, an asset provider may specify that a certain asset should only be delivered to television viewers after a related, teaser asset has been delivered during an internet session or vice versa. The noted system can monitor asset delivery across networks to ensure the proper sequencing.

The foregoing description of the present invention has been presented for purposed of illustration and description. Furthermore, the description is not intended to limit the invention to the form disclosed herein. Consequently, variations and modifications commensurate with the above teachings, and skill and knowledge of the relevant art are within the scope of the present invention. The embodiments described herein above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The invention claimed is:

1. A method of delivering assets to users using communication media, wherein each user is associated with a set of UEDs, each UED of the set of UEDs remote from and in operative communication with an asset decisioning system, the method comprising:
   first receiving one or more first indications for a first UED of a first set of UEDs associated with a first user of the users, the first indications indicative of the first UED playing a first asset of a first asset set, wherein said first receiving comprises obtaining, for a broadcast television network, one or more first identifications of one or more first asset delivery opportunities on one or more broadcast television programming networks including at least one addressable asset delivery opportunity where, for each said addressable asset delivery opportunity, different assets may be delivered to different users, wherein said first identifications include identification information concerning at least one of said broadcast television network and said one or more television programming networks;
   second receiving one or more second indications for a second UED of said first set of UEDs associated with said first user, the second indications indicative of the second UED playing said first asset, wherein said second receiving comprises obtaining, for a communications network, one or more second identifications of one or more second asset delivery opportunities including one of a network association and a programming association of each of said second asset delivery opportunities;
   based on the received first and second indications, updating user impression information associated with the first asset, the user impression information representing a level of fulfillment of campaign specification information for the first asset in relation to the user;
   comparing the updated user impression information with the campaign specification information for the first asset to make a determination that the user impression information satisfies the campaign specification information; and
   transmitting a playlist for a third UED of said first set of UEDs, the same as one of, or different than both of, said first and second UEDs based on the determination that the user impression information satisfies at least one of the campaign specification information, the playlist directing the play of a second asset, the same as or different than the first asset, of the first asset set at the third UED.

2. The method of claim 1, further comprising:
   instructing the third UED to store the second asset of the asset set at a memory structure of the third UED.

3. The method of claim 2, wherein the playlist is transmitted to the third UED in response to an assets stored indication indicative of assets stored at the memory structure of the third UED, the assets stored indication identifying the second asset.

4. The method of claim 2, wherein the second asset is played at the third UED via playback from the memory structure.

5. The method of claim 1, further comprising:
   obtaining audience feedback information from the first UED indicative of user interaction with the first UED during the playing of the first asset.

6. The method of claim 5, wherein the user interaction, in relation to the first asset, includes one of asset play speed, asset play volume, and asset play runtime.

7. The method of claim 5, wherein the user impression information is updateable at least partially based on the audience feedback information.

8. The method of claim 1, further comprising:
reporting the user impression information.

9. The method of claim 1, further comprising before the first and second receiving:
establishing, at the asset decisioning system, the first asset set, the first asset set including one or more assets for scheduling for delivery to particular users.

10. The method of claim 9, wherein the asset decisioning system is operative to:
obtain, from asset providers, decisioning information for assets, the decisioning information identifying target audiences for the assets; and
obtain audience classification information for users, the audience classification information including at least one classification parameter.

11. The method of claim 10, wherein the classification parameter relates to at least one of age, gender, income level, personal interest, or locale of the first user.

12. The method of claim 9, wherein the first asset set comprises assets for which the corresponding decisioning information matches the audience classification information of the first user.

13. The method of claim 9, wherein each asset of the first asset set is associated with an asset delivery request received by the asset decisioning system, each asset delivery request indicative of a request to deliver a corresponding asset to the user.

14. The method of claim 13, wherein the third UED accesses the second asset via a computer-based content exchange remote from the asset decisioning system.

15. The method of claim 14, wherein the computer-based content exchange delivers the second asset to the third UED at least partially based on an asset delivery request associated with the second asset.

16. The method of claim 14, wherein the computer-based content exchange comprises an IP-based data network.

17. The method of claim 1, wherein the first asset set is established in relation to an identified asset delivery opportunity.

18. The method of claim 17, wherein the identified asset delivery opportunity comprises a unique opportunity to deliver one or more assets into a designated spot of designated programming to the first user.

19. The method of claim 1, wherein the updating the user impression information comprises updating the user impression information with a time of delivery of the first asset by one of the first and second UEDs.

20. The method of claim 19, wherein the campaign specification information includes a frequency of delivery parameter, the frequency of delivery parameter indicative of a maximum impression count corresponding to a number of instances the first user receives the first asset within an identified period, the user impression information representing a level of fulfillment of the campaign specification information in relation to the frequency of delivery parameter based at least partially on the time of delivery of the first asset by the first set of UEDs.

21. The method of claim 20, wherein the campaign specification information includes a minimum time interval parameter, the minimum time interval parameter indicative of minimum time period between the instances of the first user receiving the first asset within the identified period, the user impression information representing a level of fulfillment of the campaign specification information in relation to the minimum time interval parameter based at least partially on the time of delivery of the first asset by one UED of the first set of UEDs.

22. The method of claim 1, wherein the playlist instructs the third UED to play the second asset of the first asset set based upon determining that the user impression information is less than a maximum viewing parameter associated with the campaign specification information, the maximum viewing parameter representing a predetermined level of instances for which the second asset is scheduled for playing across the first set of UEDs associated with the first user.

23. A communication system for delivering assets to users using communication media, wherein each user is associated with a set of UEDs, said communication system comprising:
an asset decisioning network system, remote from and in operative communication with each UED of a first set of UEDs associated with a first user, said asset decisioning network system operative for:
first receiving one or more first indications for a first UED of a first set of UEDs associated with a first user of the users, the first indications indicative of the first UED playing a first asset of a first asset set, wherein said first receiving comprises obtaining, for a broadcast television network, one or more first identifications of one or more first asset delivery opportunities on one or more broadcast television programming networks including at least one addressable asset delivery opportunity where, for each said addressable asset delivery opportunity, different assets may be delivered to different users, wherein said first identifications include identification information concerning at least one of said broadcast television network and said one or more television programming networks;
second receiving one or more second indications for a second UED of said first set of UEDs associated with said first user, the second indications indicative of the second UED playing said first asset, wherein said second receiving comprises obtaining, for a communications network, one or more second identifications of one or more second asset delivery opportunities including one of a network association and a programming association of each of said second asset delivery opportunities;
based on the received first and second indications, updating user impression information associated with the first asset, the user impression information representing a level of fulfillment of campaign specification information for the first asset in relation to the user;
comparing the updated user impression information with the campaign specification information for the first asset to make a determination of whether the user impression information satisfies the campaign specification information; and
transmitting a playlist for a third UED of said first set of UEDs, the same as one of, or different than both of, said first and second UEDs based on the determination of whether the user impression information satisfies the campaign specification information, the playlist directing the play of a second asset, the same as or different than the first asset, of the first asset set at the third UED.

24. The system of claim 23, wherein the third UED is configured to store assets of the asset set at a memory structure of the third UED, the stored assets including the first asset, and wherein the stored assets are selectively stored at least partially based on an instruction received at the third UED to store assets of the asset set.

25. The system of claim 24, wherein the third UED receives the playlist based on the assets stored at the memory structure of the third UED.

26. The system of claim 24, wherein the first asset is played at the third UED via playback from the memory structure.

27. The system of claim 23, wherein the first UED is configured to transmit audience feedback information from the first UED indicative of user interaction with the first UED during the playing of the first asset.

28. The system of claim 27, wherein the user interaction, in relation to the first asset, includes asset play speed, asset play volume, and asset play runtime.

29. The system of claim 27, wherein the user impression information is updateable at least partially based on the audience feedback information.

30. The system of claim 23, wherein the asset decisioning network system is configured to report the user impression information.

31. The system of claim 23, wherein the asset decisioning network system is configured to establish, at the asset decisioning network system, the first asset set, the first asset set including one or more assets for scheduling for delivery to particular users.

32. The system of claim 31, wherein the asset decisioning network system is configured to:
obtain, from asset providers, decisioning information for assets, the decisioning information identifying target audiences for the assets; and
obtain audience classification information for users, the audience classification information including at least one classification parameter.

33. The system of claim 32, wherein the classification parameter relates to at least one of age, gender, income level, personal interest, or locale of the users.

34. The system of claim 31, wherein the first asset set comprises assets for which the corresponding decisioning information matches the audience classification information of the first user.

35. The system of claim 31, wherein each asset of the first asset set is associated with an asset delivery request received by the asset decisioning network system, each asset delivery request indicative of a request to deliver a corresponding asset to the first user.

36. The system of claim 35, wherein the third UED accesses the first asset via a computer-based content exchange remote from the asset decisioning network system.

37. The system of claim 36, wherein the computer-based content exchange delivers the first asset to the third UED at least partially based on an asset delivery request associated with the first asset.

38. The system of claim 36, wherein the computer-based content exchange comprises an IP-based data network.

39. The system of claim 23, wherein the first asset set is established in relation to an identified asset delivery opportunity.

40. The system of claim 39, wherein the identified asset delivery opportunity comprises a unique opportunity to deliver one or more assets into a designated spot of designated programming to the first user.

41. The system of claim 23, wherein the updated user impression information is updated at the asset decisioning network system with a time of delivery of the first asset by the one of the first and second UEDs.

42. The system of claim 41, wherein the campaign specification information includes a frequency of delivery parameter, the frequency of delivery parameter indicative of a maximum impression count corresponding to a number of instances the first user views the first asset within an identified period, the user impression information representing a level of fulfillment of the campaign specification information in relation to the frequency of delivery parameter based at least partially on the time of delivery of the first asset by one of the first set of UEDs.

43. The system of claim 42, wherein the campaign specification information includes a minimum time interval parameter, the minimum time interval parameter indicative of minimum time period between the instances of the first user viewing the first asset within the identified period, the user impression information representing a level of fulfillment of the campaign specification information in relation to the minimum time interval parameter based at least partially on the time of delivery of the first asset by one of the first and second UEDs.

* * * * *